United States Patent [19]

Green

[11] 4,195,928

[45] Apr. 1, 1980

[54] TWO DIRECTION SCAN SORTING TECHNIQUE

[75] Inventor: Clarence A. Green, Pittsford, N.Y.

[73] Assignee: Xerox Corporation, Stamford, Conn.

[21] Appl. No.: 939,167

[22] Filed: Sep. 1, 1978

Related U.S. Application Data

[63] Continuation-in-part of Ser. No. 784,215, Apr. 4, 1977, abandoned.

[51] Int. Cl.² ............... G03B 27/42; G03G 15/28
[52] U.S. Cl. .................................. 355/51; 355/8; 355/14 R
[58] Field of Search ............... 355/50, 51, 77, 8, 11, 355/14, 66

[56] References Cited

U.S. PATENT DOCUMENTS

| | | | |
|---|---|---|---|
| 3,574,459 | 4/1971 | Hartwig et al. | 355/66 |
| 3,936,182 | 2/1976 | Sheikh | 355/14 |
| 3,997,263 | 12/1976 | Stemmle | 355/51 X |
| 4,008,958 | 2/1977 | Kingsland | 355/51 |
| 4,062,061 | 12/1977 | Batchelor et al. | 364/900 |

Primary Examiner—L. T. Hix
Assistant Examiner—W. J. Brady
Attorney, Agent, or Firm—William A. Henry

[57] ABSTRACT

A method and apparatus is disclosed for orientating output copies of original documents from a bidirectional copier that employs a sorter with the method including the step of initiating each odd numbered copy run of multiple originals from the same side of the platen.

2 Claims, 2 Drawing Figures

TWO DIRECTION SCAN SORTING TECHNIQUE

This is a continuation-in-part of application Ser. No. 784,215, filed Apr. 4, 1977, now abandoned.

BACKGROUND OF THE INVENTION

The present invention relates to bidirectional copying and more particularly to bidirectional copiers that properly orient output copies in a sorter when an odd number of copies is required.

In most copiers, traditional or unidirectional scanning is employed, i.e., scanning will start from a first or home position and continue in a first direction toward a second or end position. After reaching the end position, the scanning mechanism is returned to the home position in a second and opposite direction with no scanning taking place. Since no scanning takes place, return to the home position of the scanning mechanism is at a much faster rate than the initial scanning rate. All copies made from documents by unidirectional scanning are oriented in the same direction in output trays.

In bidirectional copying, an original resting on a platen is scanned for exposure to the photoreceptor both during the traditional scan pass and also in its return pass to the home position. One result of such an exposure arrangement is that successive images on paper copies exit the copier are turned 180° relative to each other as shown below:

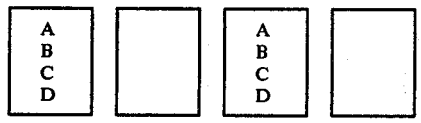

Copy # 1    Copy # 2    Copy # 3    Copy # 4

The above copy output scan is a problem in sorting the copy if the number of copies to be sorted is an odd number. This is the case because the copies in any given sorter tray will not be oriented all in the same manner relative to the top and bottom of each copy and consequently, will have to be reordered before stapling or other finishing step. For instance, assume that five copies are to be made of a 3-page original document. If each page of the original document is copied five times by two direction scanning and sorted automatically, the following "sorted" copy results:

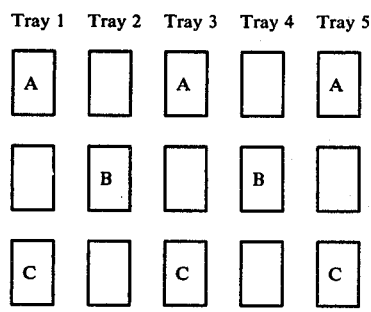

Before the copies in any of the trays above can be stapled, the individual sheets would have to be all facing in a single direction to have the copied document read correctly. This would not only be time-consuming, but would effectively reduce the advantage of the sorter.

In contrast to the above, if an even number of copies is desired, the copies in each sorter tray would be oriented all the same way although the stack copies in any individual sorter tray would be turned 180° relative to its neighboring stacks.

Accordingly, it is an object of this invention to permit the utilization of a sorter with a bidirectional copying system.

Yet another object of this invention is to uniformly orient output copies of original documents from the bidirectional scanning system into sorter bins when an odd number of copies is to be made.

The foregoing and other objects of the present invention are accomplished by initiating scanning of each document of a document set from the same position when an odd number of copies is required.

SUMMARY OF THE INVENTION

In a copier employing bidirectional scanning optics which causes a rotation of the image being copied onto copy sheets and a platen for copying a document thereon with said platen being scanned from opposite sides by the bidirectional scanning optics and a collator with multiple bins for receiving and collecting copies made from a document on the platen, an improvement is disclosed comprising selector means for controlling the number of copies to be made by controlling the number of bidirectional scans of said platen and scanning control means responsive to said selector means upon selection of an odd number of copies for compelling said bidirectional scanning means to start each initial scan of the platen from the same side of the platen whereby the copies in each of the bins are uniformly oriented in the same direction.

BRIEF DESCRIPTION OF THE DRAWINGS

For a better understanding of the invention as well as other objects and further features thereof, reference is had to the following detailed description of the invention to be used in conjunction with the accompanying drawings, wherein.

DESCRIPTION OF THE PREFERRED EMBODIMENT

The present invention can be used with any type of device that uses bidirectional optics and a sorter or collator output device. However, for the purpose of exemplary disclosure the invention will be described within the environment of a xerographic reproduction apparatus. An example of such a xerographic reproduction apparatus is shown in U.S. Pat. No. 3,866,904 issued Feb. 18, 1975, to David J. Stemmle which is incorporated herein by reference.

Figure 1:
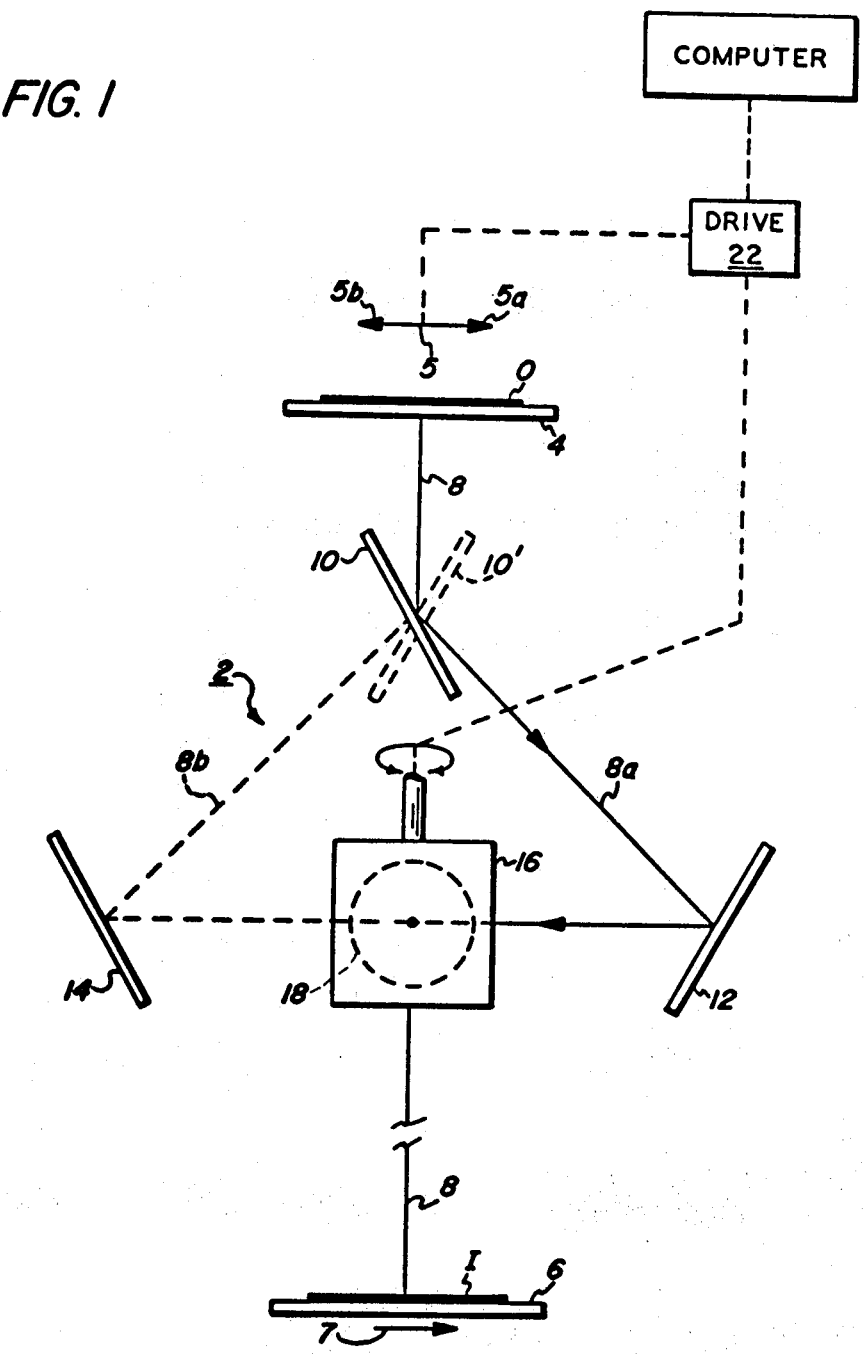
FIG. 1 is a front elevation view of a bidirectional optical system that is incorporated into an otherwise conventional copier for practicing the present invention.

Referring now to FIG. 1, an optical system which could be incorporated into U.S. Pat. No. 3,866,904 for carrying out bidirectional copying according to the present invention is generally indicated at 2 and extends between an optic plane or surface 4 and an image plane or surface 6 along an optical axis 8. The optical axis of the system includes parallel branch paths 8a and 8b.

A first reflector 10 is located along the optical axis and is mounted for rotation between a first position shown in solid line in FIG. 1 and a second position shown in phantom line. In its first position, reflector 10 deflects optical axis 8 along branch path 8a to a second fixed reflector 12. In its second or alternative position, reflector 10 deflects optical axis 8 along branch path 8b to alternate second reflector 14. Reflector 12 deflects the branch optical path 8a to a third reflector 16 which is mounted for rotation between alternate positions.

A projection lens 18 is disposed along the optical axis 8 to project an image I of an object 0 from the object surface or platen 4 to the image or photosensitive surface 6. A fourth reflector (not shown) deflects the optical axis toward the image surface 6.

With the first reflector 10 in its first position (solid line) and the third reflector 16 in its first position (solid line), the optical path 8 extends from object surface 4 to first reflector 10, to second reflector 12, to third reflector 16, to the projection lens 18, and onto the image surface 6. Along this path, light from the object 0 on the object surface 4 propagates to form an image I at the image surface 6. The image wave front propagation along this axis of propagation is, after its reflection from the third reflector 16, in the first orientation relative to the axis of propagation 8.

With the first reflector 10 in its second position (phantom lines) indicated at 10' and with the third reflector in its second position (not shown), the optical path 8 extends from object surface 4 to the first reflector 10, to alternate reflector 14, to third reflector 16, to the projection lens 18, onto image surface 6. Along this path 8b, light from an object 0 on the object surface 4 propagates to form an image I at the surface 6. The wave front propagation along this axis of propagation is, after its reflection from the third reflector 16, in a second orientation relative to the axis of propagation 8. This second image orientation is rotated 180° about the axis of propagation relative to the first image orientation.

The optical system disclosed in U.S. Pat. No. 3,574,459 to Karl Hartwig patented Apr. 13, 1971, which is incorporated herein by reference, could also be used in the present invention. In the present apparatus, the image I of object 0 is projected onto a moving photoreceptor at the image surface 6. This continual unidirectional movement of the photoreceptor is indicated by the arrow 7. In a scanning mode of operation, the object 0 is reciprocated on the object plane or platen 4 relative to the optical axis 8 along a path of travel indicated by the arrow 5. During this scanning, only a narrow band of the object is exposed to the photoreceptor at any time. This continual and progressive exposure results in a composite image of the scanned object. When the object 0 is moving in the scan direction 5a, its image is propagated along the optical axis 8 and its branch path 8a and laid down on the moving photoreceptor, in synchronism with the photoreceptor, and in a first orientation. When the object 0 is moved in the scan direction 5b, its image is propagated along the optical axis 8 in its branch 8b and laid down on the moving photoreceptor, still in synchronism with the photoreceptor, in a second orientation, rotated 180° about the axis of propagation from the first orientation. Reflectors 10 and 16 are in their solid line positions during scanning in direction 5a, and alternate positions for scanning in direction 5b.

A drive means represented at 22 is operatively connected to the optical system to effect relative reciprocations between an object 0 and an optical axis 8. Drive means 22 is also operatively connected to the first reflector 10 and the third reflector 16 to rotate the two reflectors between their alternate positions at one or the other ends of reciprocating movement between object 0 and optical axis 8. Drive means 22 is conventional and therefore is represented by a block diagram. The drive 22 operates such that when the object 0 is moving in scan direction 5a, reflectors 10 and 16 are in position to relay an image of the object along optical axis 8 and its branch path 8a. At the end of the stroke in direction 5a, and before the return of stroke in direction 5b, reflectors 10 and 16 are shifted to alternate positions so as to relay the image along optical axis 8 and its branch path 8b.

The term "bidirectional scanning system" is used herein to include not only the situation in FIG. 1 in which the optics are stationary and the object is reciprocated, but also the system where the object is stationary and the optics reciprocable.

A more detailed description of the above described optical system is disclosed in U.S. Pat. No. 4,008,958 to David O. Kingsland patented Feb. 22, 1977, which is incorporated herein by reference.

In reference to the present invention, when a two-direction scanning technique is used, the copier can still utilize a sorter even when an odd number of copies are to be made if the scan technique is used selectively. If only one copy is to be made, the two-direction scan device should be limited to traditional scan. However, if three copies are to be made or any larger odd number, the two-direction scan device can be used but the first copy of each new original must be scanned starting from the same side of the platen. It does not matter if scanning is initiated by the traditional scan pass of an original document or on the return pass then past an original document. Appropriate known logic such as U.S. Pat. No. 3,940,210 shown as a computer in FIG. 1 can be used to automatically bring the scanning mechanism to the correct side of the platen to begin scanning when an odd number of copies is dialed by the operator.

The term "computer" as shown in FIG. 1 is intended to include a programmable machine controller used to control the operation of xerographic reproduction in copiers, such as, the controller disclosed in U.S. Pat. No. 3,940,210, which is incorporated herein by reference.

In addition, the machine controller in U.S. Pat. No. 4,144,550, issued Mar. 13, 1979, which is commonly assigned with the present application, could be used in the present invention if one desired and is incorporated herein by reference.

The computer or programmable controller includes means for controlling the number of copies to be made by controlling the number of bidirectional scans of the platen and has scanning control means responsive to the selector means when selection of an odd number of copies is made that compels the bidirectional scanning means to start each initial scan of the platen from the same side of the platen. Thus, copies in each tray of the sorter or collator will be oriented in the same direction.

By way of example, if seven copies of a five-page original are to be made, the initial copy from each original would have to start in the same position of scan, i.e., with the initial copy of original number 1 progressing in the direction of scan of arrow 5a as viewed in FIG. 1 and with subsequent copy 2 being scanned in the direction of 5b with this process being repeated for seven copies, the initial scan of originals 2 through 5 would also have to commence the scanning operation in the direction of arrow 5a.

Figure 2:
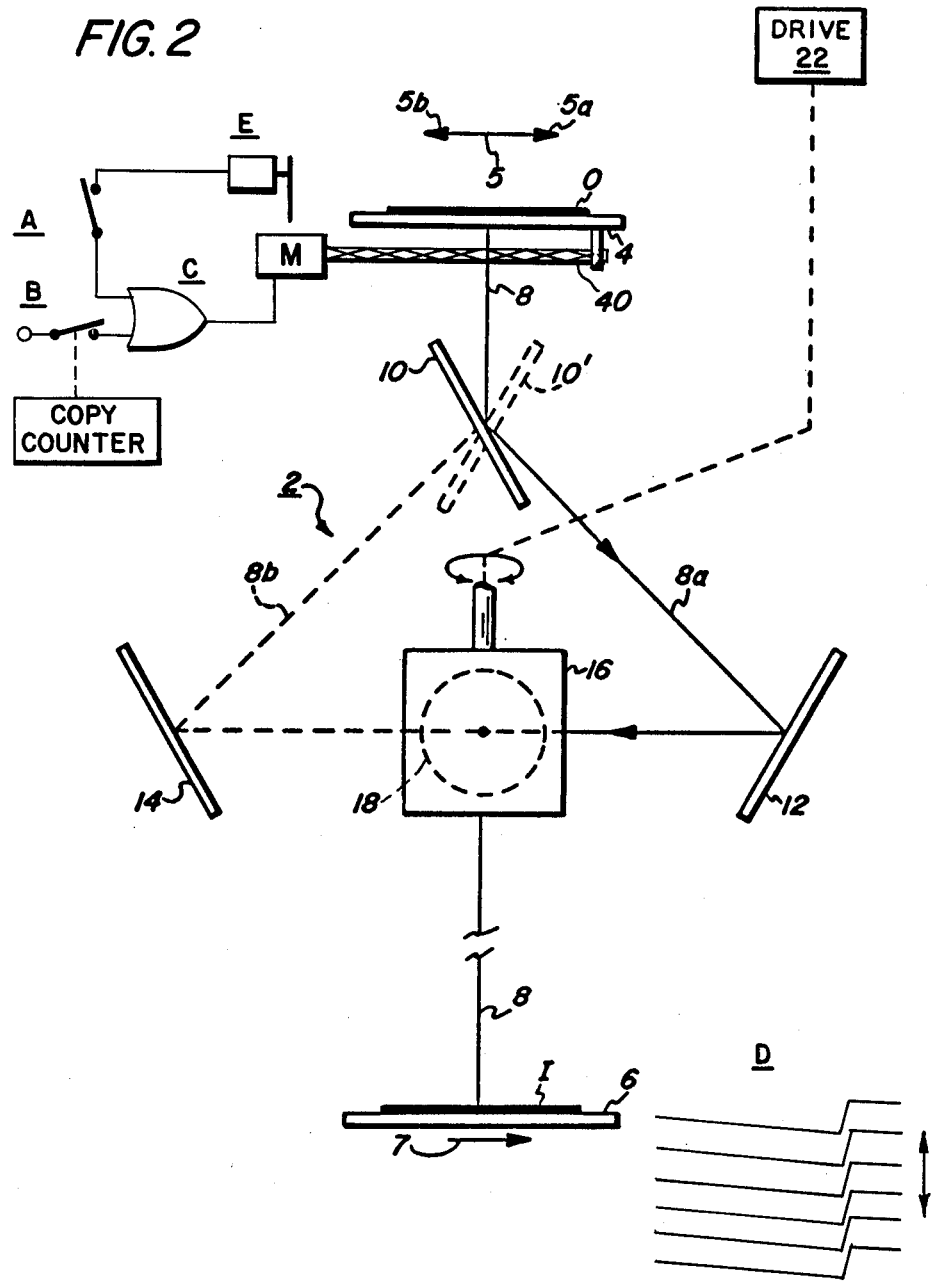
FIG. 2 is a front elevation view of a bidirectional optical system employed in a second embodiment of the invention.

In FIG. 2, an alternative embodiment of the present invention is shown wherein like numbers represent like mechanisms that operate in the same manner as described for FIG. 1. In this embodiment also, the image I of object 0 is projected onto a moving photoreceptor at the image surface 6. The object 0 is reciprocated during scanning on the object platen 4 relative to optical axis 8 along a path of travel by motor M as indicated by arrow 5. The motor reciprocates the object 0 by turning drive shaft 40. The drive shaft is designed such that continuous rotation of the shaft in one direction by motor M causes the object to be transported from position 5a to position 5b and vice versa. This conventional double helix bidirectional drive system is shown in U.S. Pat. No. 3,775,008, which is incorporated herein by reference.

In operation, normally open switch B is closed by a conventional "start print" switch, after the copy counter is set to the number of copies desired, which completes the circuit between conventional "OR" gate C and motor M. If the sorter mode is selected, switch "A" is also closed, and sorter D, which is conventional as shown in U.S. Pat. No. 3,788,640 and incorporated herein by reference, is actuated. Actuation of the motor M causes rotation of drive shaft 40 and movement of the object 0 toward and away from the right hand side of FIG. 2 to the left side, i.e. toward normally closed switch E. Switch E maintains motor M operating even if switch B is subsequently opened due to switch E's connection through "OR" gate C if switch A is closed. Continued movement of object 0 actuates (opens) switch E which removes its actuating signal to motor M through OR gate C and stops the object 0 at that side of the platen, if switch B is also open. Otherwise, this process is continued for the duration of the copy count desired, i.e., until switch B opens. According to this embodiment of the invention therefore, the image of any original is always initially scanned from the same position when the sorter mode is selected, because the object 0 can only stop at the side where switch E is located, if switch A is closed. If the object 0 had been stopped at the right side before switch B is closed and switch A is then closed, object 0 will move over to the left side automatically before copying is initiated.

If the sorter D is not being used, switch A can be left open, and the object 0 will stop at the end of the last copy scan which can be at either side of the platen here, that is, selection of the non-sorter mode of operation and the dialing of a copy count on the counter allows for bidirectional copying for each original without initiating each new copy run from the same side of the platen. In this nonsorter mode, switch A is open. Therefore, switch E is not connected to "OR" gate C, and the object 0 will stop at either side at its end of scan, whenever switch B is opened.

A control aarrangement is shown in U.S. Pat. No. 3,936,182 for a platen scanning drive system that could also be used to control operation of the scanning system in either FIG. 1 or FIG. 2 and is incorporated herein by reference.

In conclusion, an apparatus and method is disclosed whereby when a two-direction scanning technique is used, a bidirectional copier can still utilize a sorter even when an odd number of copies are to be made if the scan technique is used selectively. If only one copy is to be made, the two-direction scan device should be limited to traditional scan. If three copies or any other larger odd number of copies are to be made, the two-directional scanning device can be used but the first copy of each new original must be scanned starting from the same side of the platen. It should be understood that it does not matter if initiation of scanning is in the traditional direction or in the return direction. Conventional programmable controllers are also disclosed for carrying out the two-directional scanning technique.

In addition to the method and apparatus disclosed above, other modifications and/or additions to this invention will be readily apparent to those skilled in the art on reading this disclosure and these are intended to be encompassed within the invention disclosed and claimed herein.

What is claimed is:

1. In a copier employing bidirectional scanning optics means which causes rotation of the image being copied onto copy sheets and a platen for copying a document, said platen being scanned from opposite sides by said bidirectional scanning means and a collator with multiple bins for receiving and collating copies made from a document on said platen, the improvement comprising:
    (a) selector means for controlling the number of copies to be made by controlling the number of bidirectional scans of said platen; and
    (b) return means for promptly automatically returning said scanning means to a preset first side of said platen without scanning said platen after a preselected number of copies has been made only if the scanning means is at the opposite side of the platen after the previously selected number of copies has been made so that the copier is ready for copying of either even or odd numbers of copies of a document next selected.

2. In a copier employing bidirectional scanning optics means which causes rotation of the image being copied onto copy sheets and a platen for copying a document, said platen being scanned from opposite sides by said bidirectional scanning means and a sorter with multiple bins for receiving and sorting copies made from a document on said platen, the improvement comprising:
    (a) a sorting mode wherein start of exposure for each document is from the same side of the platen;
    (b) a non-sorting mode wherein exposure of each document begins where exposure of the last document ended; and
    (c) means for selecting between said sorting and non-sorting modes.

* * * * *